United States Patent [19]

Miyamoto et al.

[11] Patent Number: 5,740,485
[45] Date of Patent: Apr. 14, 1998

[54] REAL IMAGE VIEWFINDER WHICH SHIFTS PRISM RIDGE LINE AWAY FROM TARGET FRAME

[75] Inventors: Hidenori Miyamoto, Urayasu; Hiroshi Wakabayashi, Yokohama; Koichi Oshita, Tokyo; Motohisa Mouri, Yokohama, all of Japan

[73] Assignee: Nikon Corporation, Tokyo, Japan

[21] Appl. No.: 766,051

[22] Filed: Dec. 16, 1996

[30] Foreign Application Priority Data

Jan. 31, 1996 [JP] Japan ................. 8-016019

[51] Int. Cl.$^6$ ................. G03B 13/02
[52] U.S. Cl. ................. 396/384
[58] Field of Search ................. 396/373, 377, 396/382, 384; 359/831, 834, 835, 836

[56] References Cited

U.S. PATENT DOCUMENTS 4,926,201  5/1990  Mukai et al. ................. 396/384
5,091,739  2/1992  Kawamura ................. 396/384

*Primary Examiner*—Howard B. Blankenship

[57] ABSTRACT

A real image viewfinder of an optical device includes an eye piece through which an optical axis may be viewed with respect to a target frame. The target frame may be used for centering an optical image on an image forming plane and also for autofocus of the optical device. The real image viewfinder includes a first prism for redefining an optical axis within the optical device. The first prism has a pair of reflective planes joined about a first ridge line. The first ridge line generally includes a number of manufacturing flaws which are noticeable by the photographer. Thus, viewfinder components are shifted by a predetermined amount to present the first ridge line in an area of the viewfinder which is different from the target frame as viewed through the eye piece. Likewise, the real image viewfinder includes a second prism having a second ridge line which is also shifted away from the target frame as viewed through the eye piece.

20 Claims, 4 Drawing Sheets

REAL IMAGE VIEWFINDER WHICH SHIFTS PRISM RIDGE LINE AWAY FROM TARGET FRAME

CROSS-REFERENCE TO RELATED APPLICATIONS

This application is based upon and claims priority of Japanese Patent Application No. 08-016019 filed Jan. 31, 1996, the contents being incorporated herein by reference.

BACKGROUND OF THE INVENTION

The present invention relates to a real image viewfinder for an optical device such as a camera. More particularly, the present invention relates to a real image viewfinder in which a prism ridge line is off-set from a centered target frame of the viewfinder.

FIG. 8 (PRIOR ART) is a plan view of a real image viewfinder 50 which may be disposed within an optical device such as a camera. In FIG. 8 (PRIOR ART), reference numerals 1–4 represent objective lens groups. Movable lens groups 2 and 3 are objective lens groups which perform zooming operations as they are moved by a drive device (not shown). As illustrated, optical axis 10 is transmitted through objective lens groups 1–4, and through roof prism 31, condenser lens 6, ocular image forming plane 7, pentagonal prism 8, and eye piece 9.

FIG. 9 (PRIOR ART) is a left side view of the real image viewfinder 50 of FIG. 8 (PRIOR ART).

FIG. 10 (PRIOR ART) is a cross-sectional view of roof prism 31 along line 10—10 of FIG. 8 (PRIOR ART). Roof prism 31 includes roof planes 31a and 31b, roof ridge line 31c, and reflecting point 31P. Reflecting point 31P is where optical axis 10 reflects on roof prism 31. Roof prism 31 reflects a received image two times by way of roof planes 31a and 31b. The image is then transmitted through condenser lens 6 to ocular image forming plane 7 (illustrated in FIG. 8).

In FIG. 8 (PRIOR ART), the image which has been formed on ocular image forming plane 7 reaches a photographer's eye via pentagonal prism 8 and eye piece 9. Pentagonal prism 8 converts the optical axis into a direction parallel with the optical axis of objective lens groups 1–4.

FIG. 11 (PRIOR ART) illustrates viewfinder screen 12 as observed by a photographer through viewfinder 50. Target frame 7a is a part of viewfinder 50 that indicates a center of the viewfinder screen. More particularly, target frame 7a is an auto focus target that has been printed or imprinted as an optical pattern onto a viewing member of viewfinder 50, such as ocular image forming plane 7. Target frame 7a is formed in a center of viewfinder screen 12 (as observed through eye piece 9 of FIG. 8) where a photographer's view is most intense.

As illustrated in FIGS. 8 (PRIOR ART) and 10 (PRIOR ART), optical axis 10 reflects along roof ridge line 31c. Optical axis 10 is centered in viewfinder screen 12 of FIG. 11 (PRIOR ART) and is coincident with broken line 32. Broken line 32 represents a position of an image about an optical axis which has been reflected along roof ridge line 31c. More specifically, roof ridge line 31c matches with optical axis 10 of the objective lens groups 1–4 and passes through the target frame 7a as viewed from viewfinder screen 12.

Under ideal conditions, the edge of roof ridge line 31c is formed without flaws thereby resulting in a perfect view. However, in practice, slight flaws occur during manufacturing of roof prism 31. In this case, flaws refer to a rounded edge area or an inconsistent finish. If roof ridge line 31c has a flaw, a light ray that is reflected from roof ridge line 31c is not transmitted in the intended direction. Thus, resolution becomes relatively lower in an area where the objective image passes the roof ridge line. In the above example, this lower resolution is very noticeable to a photographer because this position is located in the center of viewfinder screen 12, where the photographer pays particular attention.

BRIEF SUMMARY OF THE INVENTION

It is therefore an object of the present invention to provide a viewfinder with a portion of a prism ridge line having decreased resolution in a position which is less noticeable to a photographer.

It is a further object of the present invention to provide a view finder wherein a prism ridge line is moved from an observed center of a viewfinder to thereby make any inherent decreased resolution less noticeable.

It is still a further object of the present invention to provide a viewfinder that reduces the potential that a roof prism ridge line and a pentagonal prism ridge line will be observed in a viewfinder of an optical device.

Objects of the invention are achieved by a real image viewfinder comprising an objective lens having an optical axis; an eye piece to receive the optical axis of the objective lens with respect to a target frame; and a prism including a first reflection plane and a second reflection plane connected at a ridge line, the prism to reflect the optical axis of the objective lens to the eye piece with respect to the target frame, wherein the ridge line is offset from the optical axis by a predetermined distance such that an optical image about the ridge line is not transmitted to the target frame as viewed from the eye piece.

Objects of the invention are achieved by a real image viewfinder comprising an objective lens having an optical axis; an eye piece to receive the optical axis of the objective lens with respect to a target frame; a first prism having a first reflection plane and a second reflection plane connected at a first ridge line, the first prism to reflect the optical axis transmitted through the objective lens; and a second prism having a third reflection plane and a fourth reflection plane connected at a second ridge line, the second roof prism to reflect the optical axis transmitted through the first prism to the target frame as viewed from the eye piece; wherein the first roof ridge line is offset from the optical axis by a first predetermined distance such that a received optical transmission along the first roof ridge line is not transmitted to the target frame as viewed from the eye piece.

Moreover, objects of the present invention are achieved by providing an optical device comprising a real image viewfinder; a photograph lens and a photograph film plane which define a photographic optical axis separate from an optical axis of an objective lens; and a viewfinder screen observed through an eye piece, wherein an upper area of the viewfinder screen is covered during close-range operation to avoid parallax between the photographic optical axis and the optical axis of the objective lens, and wherein a ridge line is disposed between a target frame and an upper area of the viewfinder screen as viewed from the eye piece.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
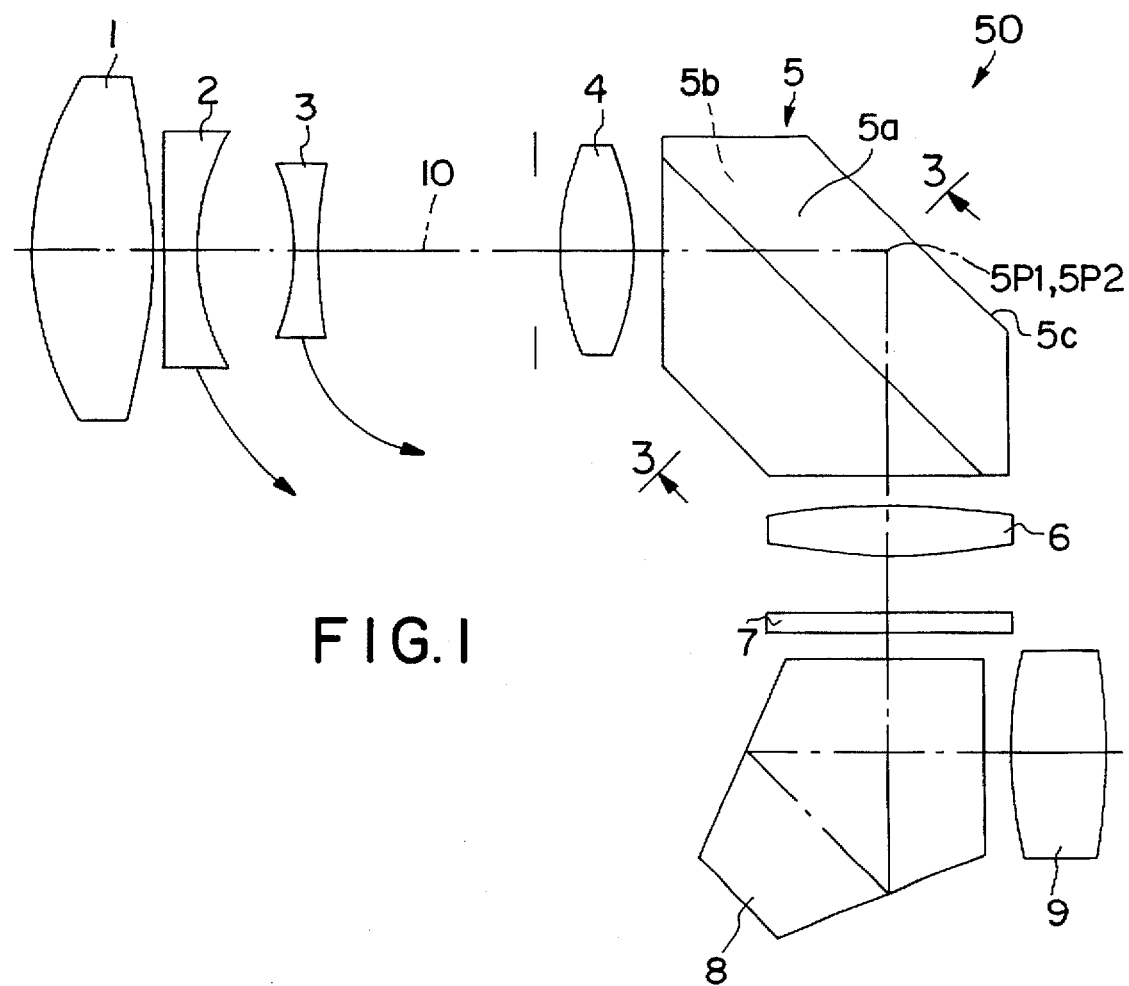
FIG. 1 is a plan view of a real image viewfinder according to an embodiment of the present invention.

Reference will now be made in detail to the preferred embodiments of the present invention, examples of which are illustrated in the accompanying drawings, wherein like reference numerals refer to like elements throughout.

Referring in particular to FIGS. 1–4, a real image viewfinder according to a preferred embodiment of the present invention is shown and described. A detailed explanation of reference numerals identical to elements set forth in the Background of the Invention section is omitted.

Figure 2:
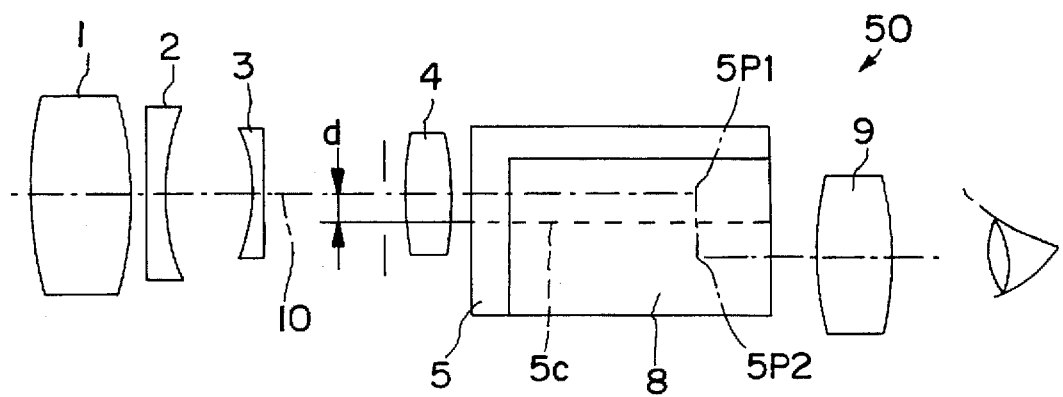
FIG. 2 is a side view of the real image viewfinder illustrated in FIG. 1.
Figure 3:
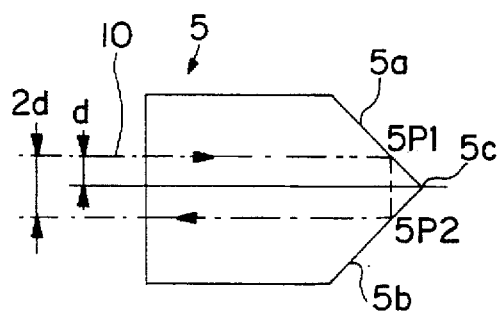
FIG. 3 is a cross-sectional view of a roof prism taken along line 3—3 of FIG. 1.

FIG. 1 is a plan view of a real image viewfinder according to an embodiment of the present invention. FIG. 2 is a side view taken from the left side of the viewfinder of FIG. 1 which particularly illustrates roof prism 5. FIG. 3 is a cross-sectional view of roof prism 5 taken along line 3—3 of FIG. 1.

Turning now to FIG. 1, optical axis 10 passes through objective lens groups 1–4 and roof prism 5. Roof prism 5 includes roof planes 5a and 5b along with roof ridge line 5c. Reflection point 5P1 represents a point where optical axis 10 is reflected onto roof plane a and reflection point 5P2 represents a point where optical axis 10 is reflected onto roof plane 5b.

As illustrated in FIG. 2, roof ridge line 5c of roof prism 5 is a dashed line. Roof ridge line 5c is positioned by a distance "d" below optical axis 10. As a result and as illustrated in FIG. 3, the height of optical axis 10 is lowered by a distance "2d" before transmission to ocular image forming plane 7. Condenser lens 6, ocular image forming plane 7, pentagonal prism 8, and eye piece 9 are then re-positioned with respect to the optical axis 10, which has been moved by "2d."

Figure 4:
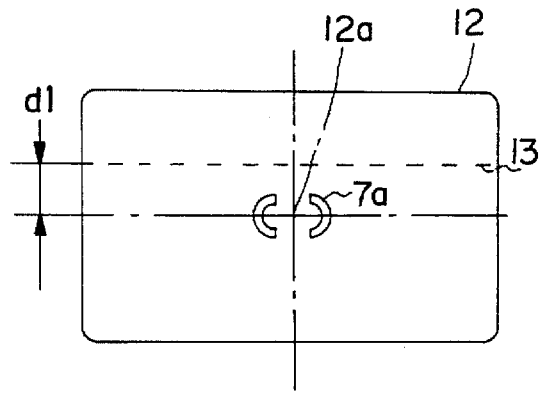
FIG. 4 is a viewfinder screen as observed by a photographer through a viewfinder according to an embodiment of the present invention.

FIG. 4 illustrates viewfinder screen 12 as observed by a photographer through viewfinder 50. Target frame 7a indicates an autofocus target that is printed or imprinted onto ocular image forming plane 7. However, according to another embodiment of the invention, target frame 7a may be printed or imprinted onto any optical element such that it generally designates a desired area when viewed through eye piece 9. Because the height of optical axis 10 has been changed by a distance of "2d" by roof prism 5, the optical elements between roof prism 5 and the photographer are re-positioned according to the changed optical axis. Optical axis 10 then passes through centerpoint 12a of viewfinder screen 12. As illustrated, an image reflected along ridge line 5c is formed on broken line 13 in viewfinder screen 12. The distance d1 from the center of viewfinder screen 12a to broken line 13 has a value proportionate to the shifted amount "d" between roof ridge line 5c and optical axis 10 illustrated in FIG. 2.

Although it would be ideal for the edge of roof ridge line 5c to be formed without flaws, in reality, slight flaws occur during manufacturing as explained above. Due to these flaws in roof ridge line 5c, the resolution of an area corresponding to a ridge line on a viewed image becomes relatively low compared to a surrounding area. More specifically, the resolution of an image projected along broken line 13 in FIG. 4 decreases.

However, by way of the present embodiment, the area about broken line 13 becomes less noticeable to the photographer because this area is re-positioned away from an area of the photographer's primary attention, namely target frame 7a. Target frame 7a is not only used to center an object within the viewfinder but is often used for autofocus of an optical device such as a camera.

According to the embodiment of FIG. 1 explained above, the roof reflection plane is positioned in such a manner that the optical axis of the objective lens is not reflected along the ridge line of the roof reflection plane in the viewfinder screen. The image that is reflected on the ridge line of the roof reflection line is moved away from the center of the screen. Hence, a decrease in resolution along ridge line 31c of roof prism 31 becomes less noticeable to the photographer.

Figure 5:
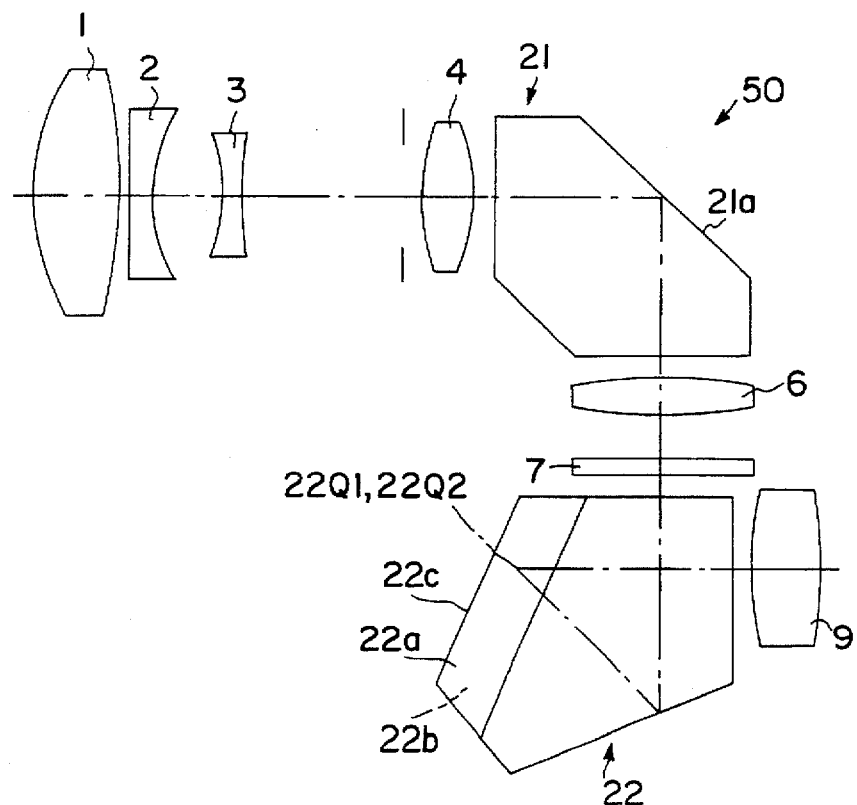
FIG. 5 is a plan view of a real image viewfinder according to another embodiment of the present invention.

FIG. 5 illustrates a second preferred embodiment according to the present invention. FIG. 5 is a plan view of a real image viewfinder which is a variation of the above embodiment. FIG. 5 illustrates reflection prism 21 which includes reflection plane 21a forming an angle of 45° with respect to the optical axis. Pentagonal roof prism 22 includes roof planes 22a and 22b which are joined at roof ridge line 22c. According to this embodiment, pentagonal roof prism 22 is positioned such that roof ridge line 22c is shifted from the optical axis 10. Accordingly, optical axis 10 is transmitted about reflection points 22Q1 and 22Q2. This provides a similar effect as illustrated in FIG. 4 such that pentagonal roof ridge line 22c is shifted away from target frame 7a as observed through eye piece 9.

Figure 6:
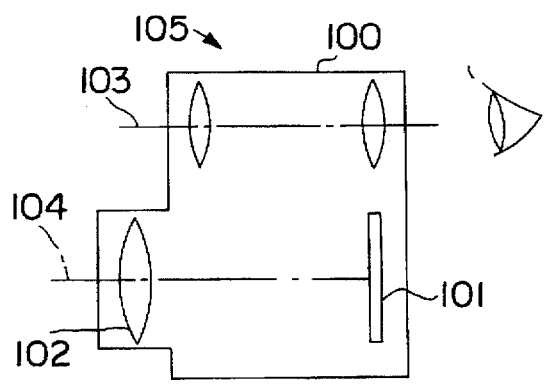
FIG. 6 is a side view of a viewfinder optical system which is separate from a photographic optical system according to an embodiment of the present invention.

FIG. 6 is a side view of an optical device having a separate viewfinder optical system and photographic optical system. According to FIG. 6, camera 105 includes a real image viewfinder according to an embodiment of the present invention. Camera 105 has a body 100 which houses photographic film 101 along a photograph film plane and houses photographic lens 102. Optical axis 103 is an optical axis of the viewfinder optical system while optical axis 104 is an optical axis of the photographic optical system.

In an embodiment where the optical axis of the viewfinder optical system and the optical axis of the photographic optical system are vertically shifted, as shown in FIG. 6, a parallax problem occurs. Because of the parallax problem, optical axis 103 is shifted with respect to optical axis 104 during close-range operation. Thus, an image appearing in the viewfinder screen is shifted from an image to be actually photographed. However, this problem does not occur for far-range operation.

Figure 7:
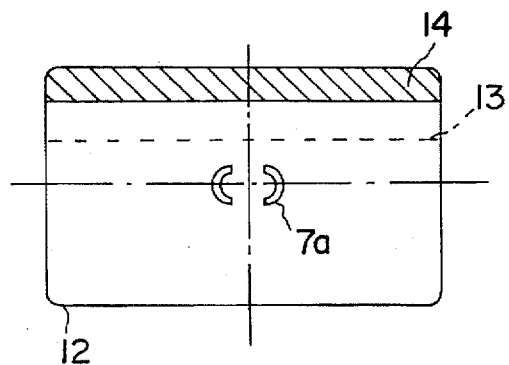
FIG. 7 is a camera viewfinder screen as observed by a photographer through a viewfinder according to an embodiment of the present invention.
Figure 8:
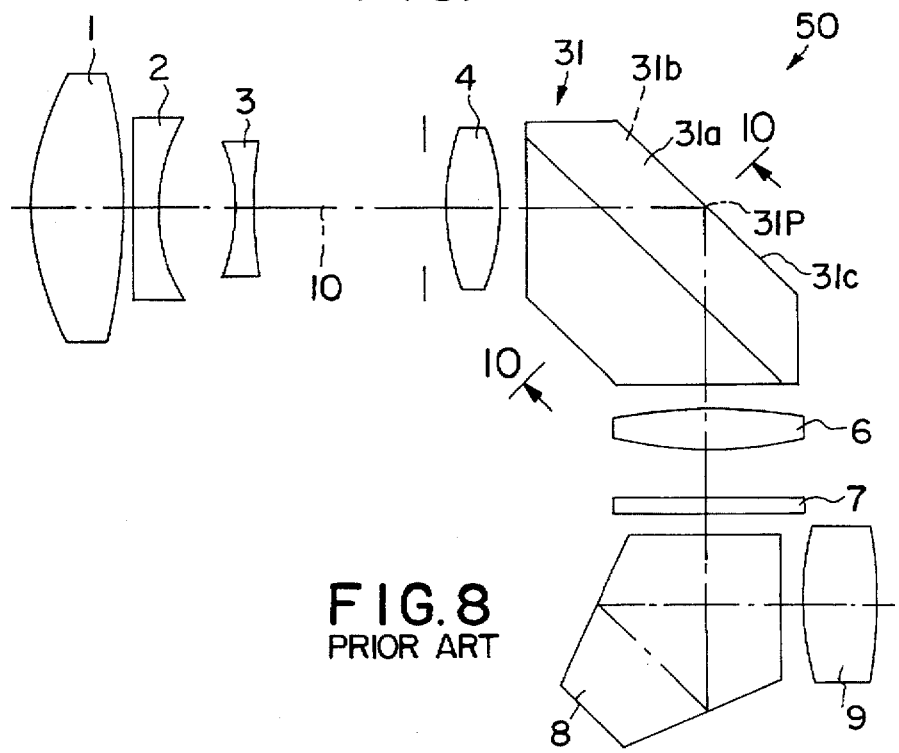
FIG. 8 (PRIOR ART) is a plan view of a real image viewfinder which forms a foundation for understanding the present invention.
Figure 9:
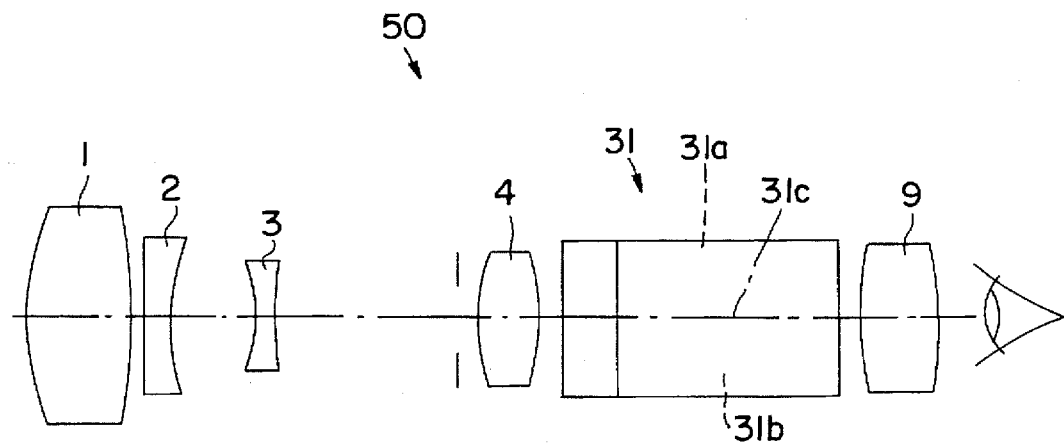
FIG. 9 (PRIOR ART) is a side view of the real image viewfinder of FIG. 8 (PRIOR ART).
Figure 10:
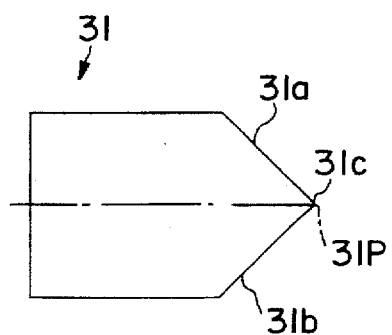
FIG. 10 (PRIOR ART) is a cross-sectional view of a roof prism taken along line 10—10 of FIG. 8 (PRIOR ART).
Figure 11:
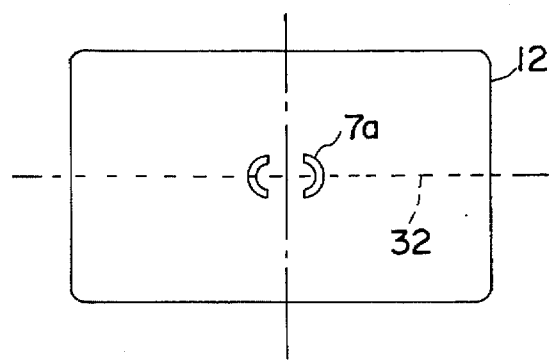
FIG. 11 (PRIOR ART) illustrates a viewfinder screen as observed by a photographer through a viewfinder which forms a foundation for understanding the present invention.

In order to compensate for the parallax problem during close-range operation, camera 105 includes a mechanism (not shown) that covers upper area 14 of viewfinder screen 12 (illustrated in FIG. 7). Through the operation of covering upper area 14, the image range of the camera and the viewfinder are brought closer, to thereby reduce the parallax problem. As illustrated, the center of the observable viewfinder screen moves downward and the observed center point as viewed by a photographer also moves downward.

According to this embodiment, an image reflected along roof ridge line 5c is generally formed above target range 7a of viewfinder screen 12, along broken line 13. Thus, as upper area 14 is covered by the mechanism, the apparent center of viewfinder screen 12 is moved downward and broken line 13 moves even farther away from the apparent center of viewfinder screen 12.

As explained above, by moving roof ridge line 5c of roof prism 5 with respect to the optical axis, an image reflected along roof ridge line 5c in viewfinder screen 12 is formed above the center of viewfinder screen 12 at broken line 13. On the other hand, with a camera that does not have a mechanism to cover the upper area of the viewfinder screen for the purpose of parallax compensation, the reflected image along roof ridge line 5c may be formed below the center of viewfinder screen 12. In other words, roof ridge line 5c of roof prism 5 may be arranged in such a manner that it is moved downward with respect to optical axis 10.

According to the embodiment of FIG. 7, as the image that is reflected along the ridge line of the roof reflection plane is shifted upward from the center of the screen, the image that is reflected along the ridge line of the roof reflection plane does not appear in the center of the reduced screen even if upper area 14 blocks the upper portion of viewfinder screen 12. Thus, the decrease in the resolution is less noticeable to the photographer.

Moreover, according to the above preferred embodiments, an explanation has been provided for a real image viewfinder wherein an optical axis of an objective lens differs from an optical axis of an eye piece in a horizontal direction of an optical device such as a camera. On the other hand, the principles of the preferred embodiments of the present invention may be applied to a viewfinder device in a single-lens reflex camera, wherein the optical axis of the objective lens differs from an optical axis of the eye piece in the vertical direction of the camera. In this case, the image that is reflected along a roof ridge line is formed in a vertical direction of the viewfinder screen. However, according to the present invention, the image moves laterally away from the center of the view finder screen thereby reducing the possibility that the photographer will notice.

Furthermore, it is not necessary to limit the direction of the shift of the objective lens and eye piece to the above horizontal and vertical directions. The present invention may be applied to a real image viewfinder wherein an axis is formed in a diagonal direction.

Moreover, the application of the present invention is not limited to a camera that uses film. The present invention may be applied to, for example, an electronic still camera, video camera, or other optical device that includes a real image viewfinder.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A real image viewfinder comprising:
   an objective lens having an optical axis;
   an eye piece to receive the optical axis of said objective lens with respect to a viewed target frame; and
   a prism including a ridge line, a first reflection plane, and a second reflection plane connected to the first reflection plane at the ridge line, said prism to reflect the optical axis of said objective lens with respect to the target frame of said eye piece, wherein the ridge line is offset from the optical axis by a predetermined distance as viewed through said eye piece such that an optical image transmitted through the ridge line is not transmitted to the target frame.

2. The real image viewfinder according to claim 1, further comprising:
   an image forming plane disposed along the optical axis between said prism and said eye piece and having an optical pattern, wherein the optical pattern is positioned in the target frame of said eye piece.

3. The real image viewfinder according to claim 2, wherein the image reflected along the ridge line of said prism is located above the target frame as observed through said eye piece.

4. The real image viewfinder according to claim 1, wherein the prism is a roof prism.

5. The real image viewfinder according to claim 1, wherein the prism is a pentagonal prism.

6. A real image viewfinder comprising:
   an objective lens having an optical axis;
   an eye piece to receive the optical axis of said objective lens with respect to a target frame;
   a first prism having a first ridge line, a first reflection plane, and a second reflection plane connected to the first reflection plane at the first ridge line, said first prism to reflect the optical axis transmitted through said objective lens; and
   a second prism having a second ridge line, a third reflection plane, and a fourth reflection plane connected to the third reflection plane at the second ridge line, said second prism to reflect the optical axis transmitted through said first prism to the target frame as viewed through said eye piece;
   wherein the first ridge line is offset from the optical axis by a first predetermined distance such that a received optical transmission along the first ridge line is not transmitted to the target frame as viewed through said eye piece.

7. The real image viewfinder according to claim 6, wherein the second ridge line is offset from the optical axis by a second predetermined distance such that a received optical transmission along the second ridge line is not transmitted to the target frame as viewed through said eye piece.

8. The real image view finder according to claim 6, wherein the first prism is a roof prism.

9. The real image viewfinder according to claim 8, wherein the second prism is a pentagonal prism.

10. A real image viewfinder comprising:
    an objective lens having an optical axis;
    an eye piece to receive the optical axis of said objective lens with respect to a target frame;

a first prism having a first reflection plane and a second reflection plane connected at a first ridge line, said first prism to reflect the optical axis transmitted through said objective lens; and a second prism having a third reflection plane and a fourth reflection plane connected at a second ridge line, said second prism to reflect the optical axis transmitted through said first prism to the target frame as viewed through said eye piece;

wherein the second ridge line is offset from the optical axis by a first predetermined distance such that a received optical transmission along the second ridge line is not transmitted to the target frame as viewed through said eye piece.

11. The real image viewfinder according to claim 10, wherein the first prism is a roof prism.

12. The real image viewfinder according to claim 10, wherein the second prism is a pentagonal prism.

13. An optical apparatus comprising:

an objective lens having an optical axis;

an eye piece to receive the optical axis of said objective lens with respect to a target frame;

a first prism having a first ridge line, a first reflection plane, and a second reflection plane connected to the first reflection plane at the first ridge line, said first prism to reflect the optical axis transmitted through said objective lens;

a photograph lens and a photograph film plane which define a photographic optical axis separate from the optical axis of said objective lens; and a viewfinder screen observed through said eye piece, wherein an upper area of said viewfinder screen is covered during close-range operation to avoid parallax between the photographic optical axis and the optical axis of said objective lens, and the first ridge line as observed through the viewfinder screen is disposed between the target frame and the upper area of said viewfinder screen.

14. The optical apparatus according to claim 13, wherein the first prism is a roof prism.

15. The optical apparatus according to claim 13, further comprising:

a second prism having a second ridge line, a third reflection plane, and a fourth reflection plane connected to the third reflection plane at the second ridge line, said second prism to reflect the optical axis transmitted through said first prism to the target frame with respect to said eye piece.

16. The optical apparatus according to claim 15, wherein the first prism is a roof prism.

17. The optical apparatus according to claim 16, wherein the second prism is a pentagonal prism.

18. The optical apparatus according to claim 13, further comprising:

an ocular image forming plane disposed along the optical axis and between said first and second prisms, wherein the target frame is disposed on said ocular image forming plane and is viewed through said eye piece.

19. The optical apparatus according to claim 18, further comprising:

a condenser lens disposed between said first prism and said ocular image forming plane, wherein the condenser lens condenses an optical signal transmitted through said first prism upon transmission to said ocular image forming plane.

20. The optical apparatus according to claim 13, wherein said objective lens is a zoom lens which moves along the optical axis to magnify a received optical image.

* * * * *